Jan. 18, 1927.
F. S. BASTER
1,614,773
OILING SYSTEM FOR INTERNAL COMBUSTION ENGINES
Filed Oct. 3, 1924     3 Sheets-Sheet 1
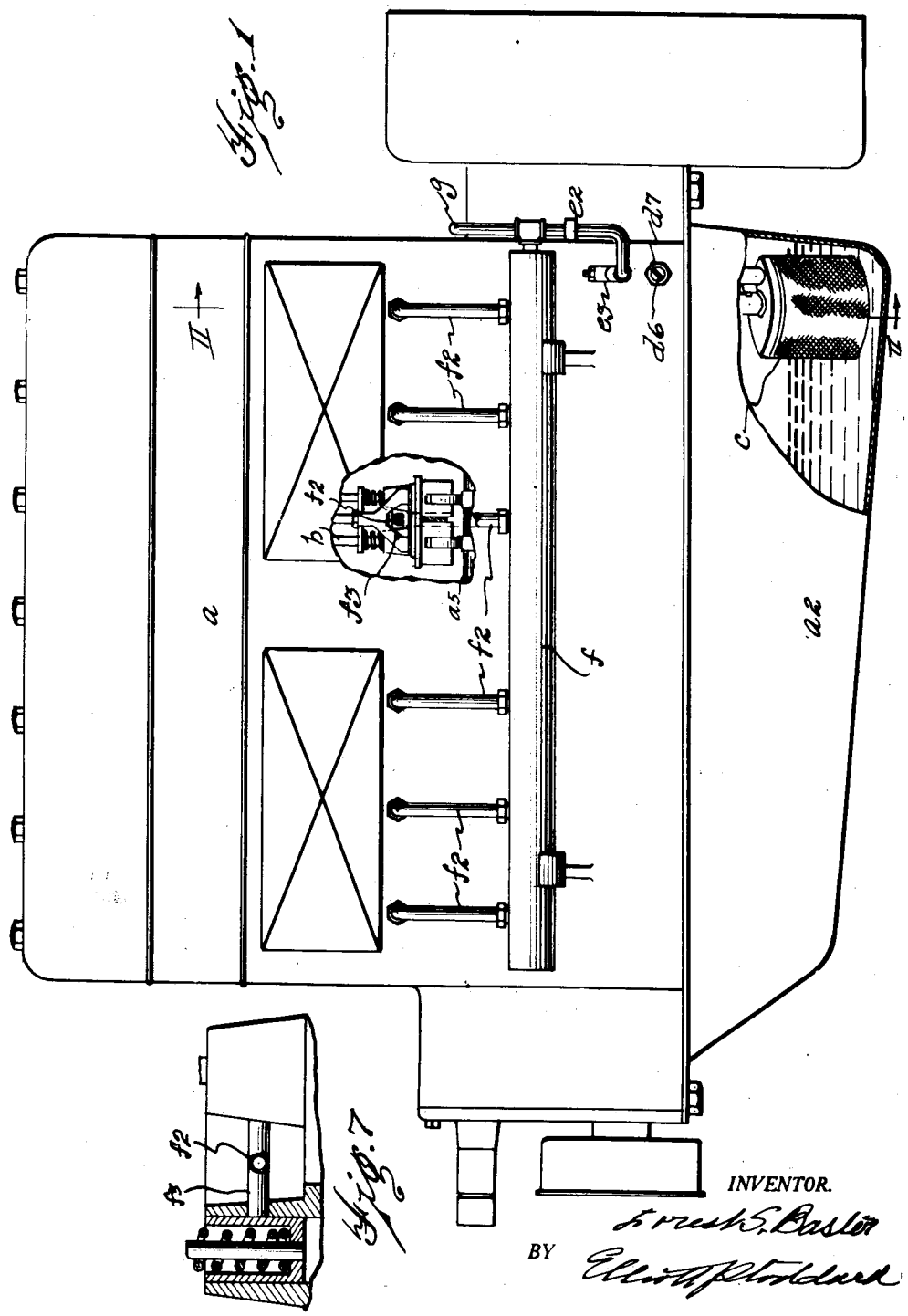
INVENTOR.
Fresh S. Baster
BY
ATTORNEY.

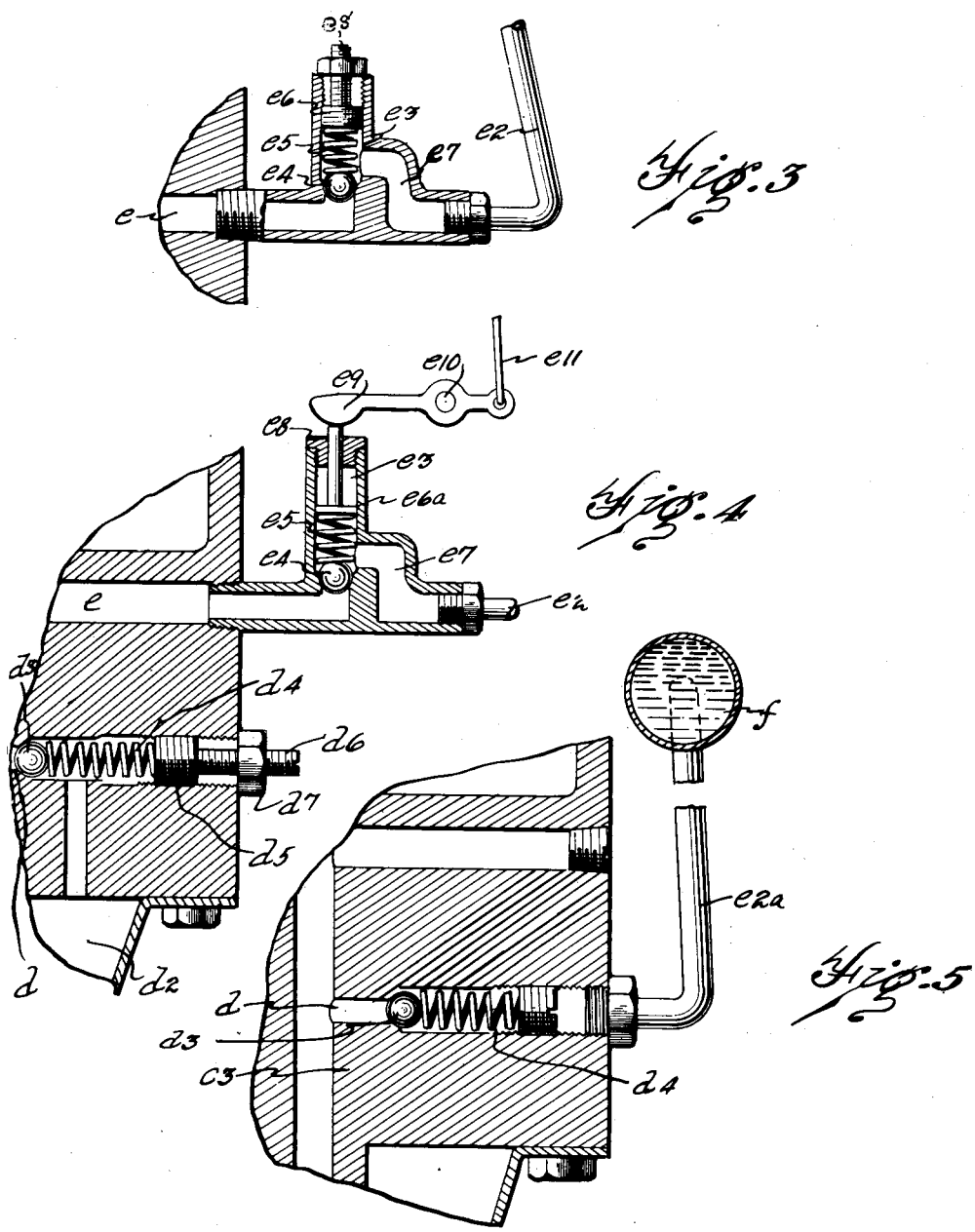

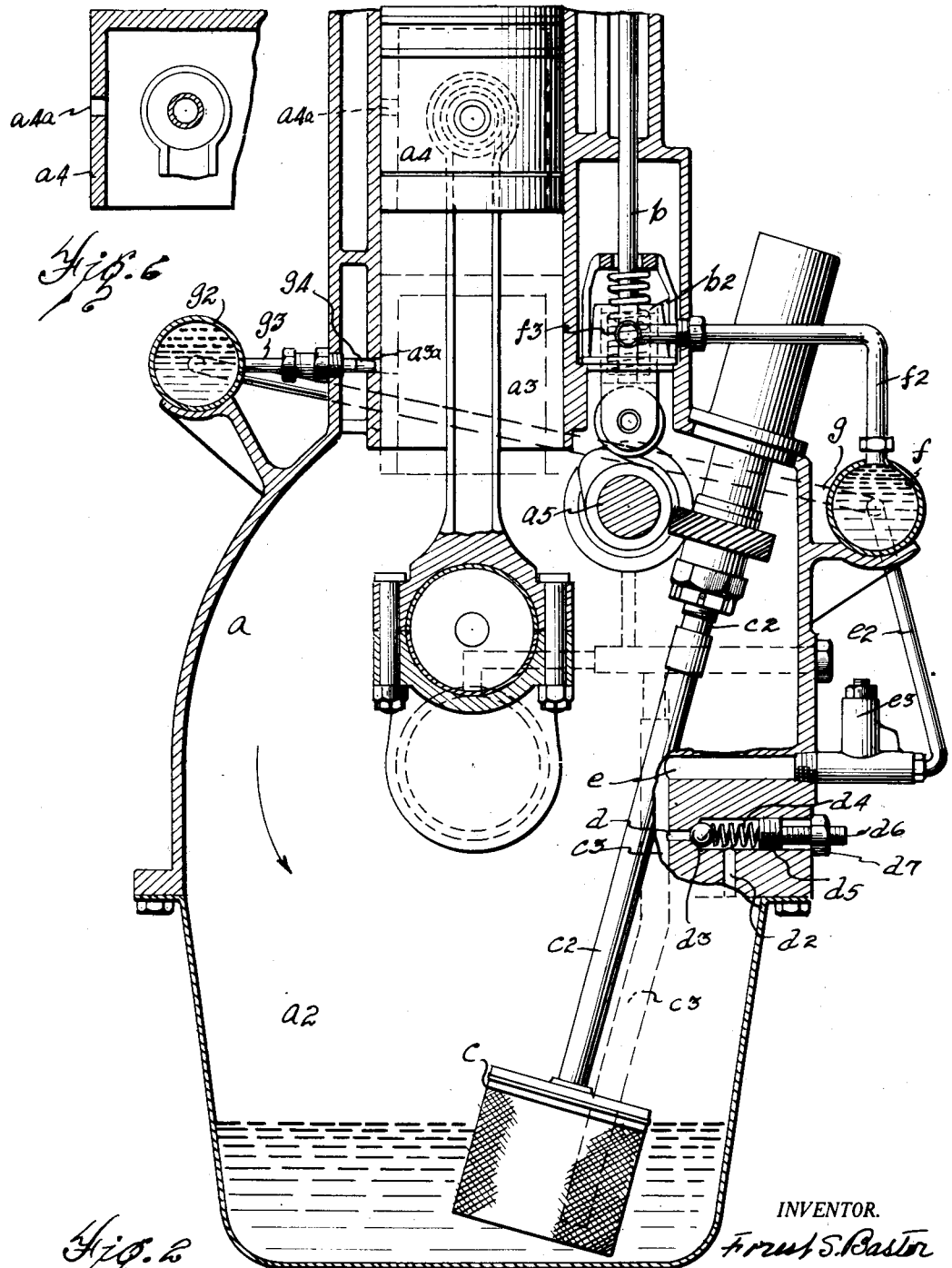

Patented Jan. 18, 1927.

1,614,773

UNITED STATES PATENT OFFICE.

FOREST S. BASTER, OF DETROIT, MICHIGAN.

OILING SYSTEM FOR INTERNAL-COMBUSTION ENGINES.

Application filed October 3, 1924. Serial No. 741,506.

My invention relates to oiling systems for internal combustion engines and a special object of my improvements is to provide an improved oiling system for automobile engines that shall deliver to the parts requiring it a special quantity of lubricating oil when the engine is cold and is just starting into motion. I accomplish this object by the device illustrated in the accompanying drawings in which:—

Figure 1 is a side elevation, partly broken away, of an automobile engine with an apparatus embodying my invention attached thereto.

Fig. 2 is a sectional elevation on the line II, II, (Fig. 1), looking in the direction of the arrows.

Fig. 3 is a detail sectional view of the auxiliary feed apparatus.

Fig. 4 is a detail sectional view of a modified form of the auxiliary feed apparatus also showing adjacent parts of the engine.

Fig. 5 is a sectional detail view of a modified construction.

Fig. 6 is a sectional detail view of a part of the piston.

Fig. 7 is a detail partly in section showing the relation between the oil conduit and the valve-actuating part.

$a$ indicates the engine of which $a^2$ is the lower part of the crank case and $a^3$ the bore of a cylinder. $a^4$ is the piston and $a^5$ the cam shaft. $b$ is a valve actuating rod. $c$ is the oil pump. This may be a conventional construction which acts to force the lubricating oil from the lower part of the crank case through a conduit $c^3$ and distribute it to the various bearings and places on the engine where the lubricating oil is regularly required.

$d$ is a passage leading from the conduit $c^3$ outward and having a valve seat therein upon which a ball valve $d^3$ engages. $d^4$ is a spring acting to hold the valve $d^3$ upon its seat with the required force. $d^5$ is a screw-threaded piston engaging screw threads in the passage $d$ and bearing upon the outer end of the spring $d^4$. $d^6$ is a screw-threaded stem extending axially outward from the cylinder $d^5$ and provided with a slot at its outer end in which a screw-driver may engage to turn the cylinder $d^5$ to screw it inward or outward to adjust the tension of the spring $d^4$. $d^7$ is a nut engaging upon the stem $d^6$, its inner face engaging the wall around the outer end of the passage $d$. The nut $d^7$ acts as a jam-nut to secure the cylinder $d^5$ against accidental displacement. $d^2$ is an overflow passage leading from the passage $d$ at a point between the valve $d^3$ and the piston $d^5$ back into the crank case. The above described construction is conventional.

$e$ is a second passage leading outward from the passage $c^3$. $e^3$ is a valve casing engaging in the passage $e$, (Fig. 3), containing a valve $e^4$ resting upon its seat and opening outward. $e^5$ is a spring normally holding the valve $e^4$ upon its seat. $e^6$ is an adjustable piston similar to $d^5$ for adjusting the tension of said spring. $e^7$ is a continuation of the passage $e$ beyond the valve $e^4$. $e^8$ is a stem extending outward from the piston $e^6$. The construction is altogether similar to that of $d^6$.

$e^2$ is a pipe forming an extension of the passages $e$, $e^7$, and leading to a distributing reservoir $f$. $f^2$ indicates conduits leading from the reservoir $f$ to the bearings of the different valve actuating parts $b$. $g$ is a conduit leading from the reservoir $f$ to a reservoir $g^2$ upon the opposite side of the engine. $g^3$ is a conduit leading from the reservoir $g^2$ to the interior surface of the cylinder $a^3$ through an opening $a^{3a}$ in the cylinder wall. There is a conduit $g^3$ to each cylinder upon the same side of the cylinder as the crank on the working stroke. The piston $a^4$ covers the opening $a^{3a}$ toward the lower end of its stroke.

The operation of the above described device is as follows:—

The spring $d^4$ is adjusted to the tension required for the ordinary operation of lubrication and the spring $e^5$ is set to a lower tension, perhaps so that the valve $e^4$ shall raise from its seat at a pressure 5 lbs. less than that required to raise the valve $d^3$ from its seat. When the engine starts up and the parts are cold, the pressure in the conduit $c^3$ will rise considerably above the normal and force the valve $e^4$ from its seat, thus furnishing an additional supply of oil to the valve actuating part $b$ and the cylinder $a^3$ and the piston $a^4$.

In the modification shown in Fig. 4, provision is made so that the pressure upon the spring $e^5$ may be relieved at will to regulate the pressure so as to furnish the additional supply of oil at any time required, that is to say, by suitable conventional means, $e^{11}$, the lever arm $e^9$ resting upon the top of the stem $e^8$ and pivoted at $e^{10}$ is rocked to lessen the tension on the spring $e^5$ so that the valve $e^4$ rises from its seat at whatever pressure there may be in the system.

In the modification shown in Fig. 5, the return passage for the relief valve is omitted and the relief passage $d$ is connected directly by a conduit $e^{2a}$ with the reservoir $f$. In this case when the engine starts up the pressure accumulates and the valve $d^3$ rises from its seat and oil is forced as above described to the valve actuating apparatus and the cylinder and piston.

The oil is delivered at $a^{3a}$ because the piston is most strongly forced away from this wall by the lateral resultant of the force upon the connecting rod.

An aperture $a^{4a}$ (Fig. 6) is formed through the piston wall so that the jet of oil delivered at $a^{3a}$ may be projected through said aperture at one position of the piston to lubricate the joint between the connecting rod and piston.

What I claim is:—

1. The combination with an internal combustion engine having a force feed oiling system, of a branch passage communicating with said system and leading to a point requiring a special supply of oil on starting the engine, and a valve controlled by the pressure of the oil in said system in said auxiliary passage opening away from the main system.

2. The combination with an internal combustion engine having a force feed oiling system, of a branch passage communicating with said system and leading to a point requiring a special supply of oil on starting the engine, and a valve controlled by the pressure of the oil in said system in said auxiliary passage opening away from the main system and means for adjusting the pressure on said valve.

3. The combination with an internal combustion engine having a force feed oiling system and a pressure controlled relief valve for said system, of an auxiliary passage leading from said system to a point requiring special lubrication on the starting of the engine and a pressure controlled valve in said auxiliary passage adapted to open at a lower pressure than said relief valve.

4. The combination with an internal combustion engine having a force feed oiling system, of a branch passage communicating with said system and leading to an aperture in the cylinder wall opposite the piston and a piston having an aperture through its wall adapted to register with the aperture in the piston wall at one point of the stroke, the joint between the piston and connecting rod being located opposite said aperture for the purpose described.

In testimony whereof, I sign this specification.

FOREST S. BASTER.